Oct. 18, 1932.  D. WILLEY  1,883,210
INKWELL
Filed Dec. 22, 1930    2 Sheets-Sheet 1
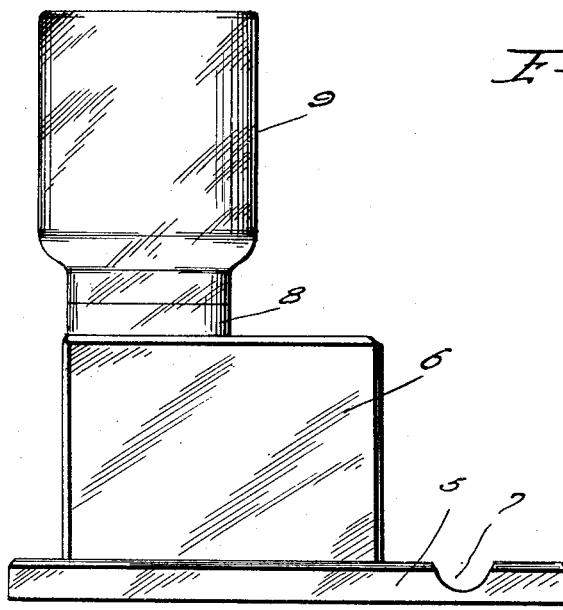
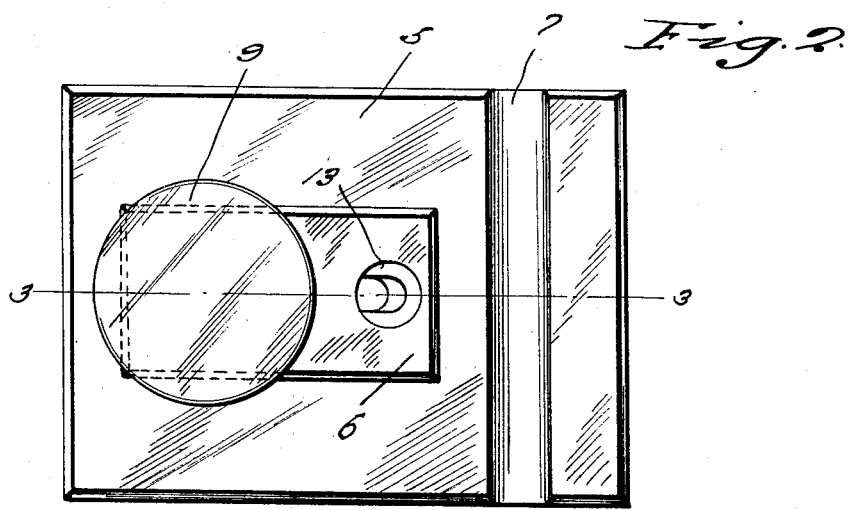
Inventor
Daniel Willey
By Clarence A. O'Brien
Attorney

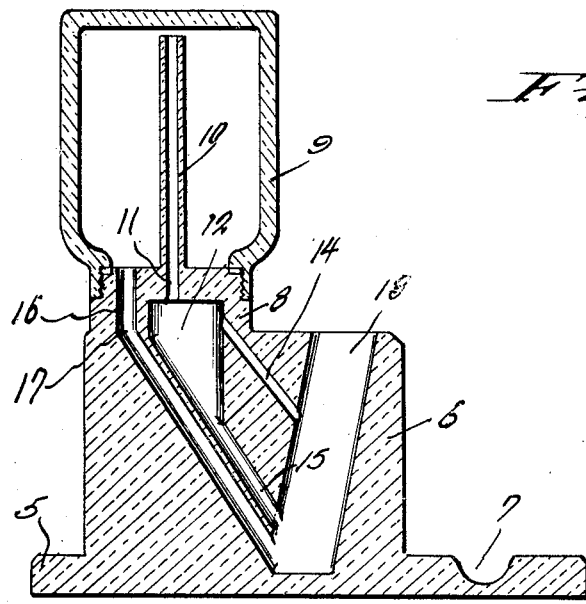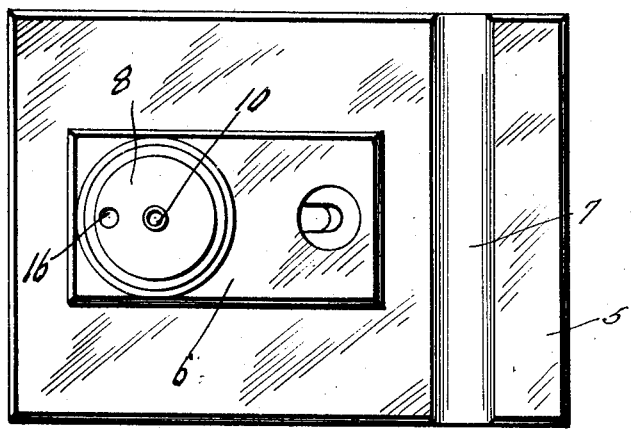

Patented Oct. 18, 1932

1,883,210

UNITED STATES PATENT OFFICE

DANIEL WILLEY, OF SULPHUR, OKLAHOMA

INKWELL

Application filed December 22, 1930. Serial No. 504,108.

This invention appertains to new and useful improvements in ink wells, and more particularly to an ink well of the self-feed type.

The principal object of this invention is to provide an ink well of the gravity feed type wherein the level of the ink in the pen pool determines the amount to be fed thereto.

Other important objects and advantages of the invention will be found in the following specification and claim.

In the drawings:—

Figure 1 represents a side elevational view of the novel ink well.

Fig. 2 represents a top plan view of the ink well.

Fig. 3 represents a vertical sectional view taken substantially on the line 3—3 of Fig. 2.

Fig. 4 represents a top plan view of the ink well structure with the reservoir removed.

Referring to the drawings wherein like numerals designate like parts, it can be seen that numeral 5 represents a base plate having a block 6 located thereon slightly toward one end thereof so as to leave an end portion of the base free in which a pen receiving groove 7 may be provided. The block 6 is of rectangular shape and toward one end thereof is a circular upstanding protuberance 8 provided with a reduced threaded extension for engagement into the transparent reservoir 9.

Extending upwardly from the reduced extension of the protuberance 8 is the tube 10 which terminates slightly below the upper end of the reservoir 9.

The tube 10 communicates at its lower end with a duct 11 which is in communication with the top of a chamber 12 within the upper portion of the block 6 and protuberance 8. Extending downwardly through the block 6 and terminating within the base plate 5 is the pen point receiving well 13 and extending from the chamber 12 and opening into the well 13 is the upper duct 14 and the lower duct 15.

Extending downwardly from the upper end of the protuberance 8 is the duct 16, which diverges as at 17 toward the well 13 and opens into the well 13 at the bottom thereof.

It can now be seen that ink will gravitate to the duct 16 and flow into the well 13 until the level reaches a point above the lower end of the duct 14. This shuts off the air supply to the reservoir 9 and prevents the gravitation of any further ink.

When the volume of ink in the well 13 is lowered by the filling of a fountain pen or the like, the exposure of the lower end of the duct 14 will permit air to enter the reservoir 9 through the duct 14, chamber 12 and tube 10 and again permit the ink to gravitate through the duct 16 through the well. If practically all the ink in the well is suddenly removed therefrom, such as by the filling of a large fountain pen, both the ducts 14 and 15 will be above the level of the ink in the well so that air will rush thru the two ducts into the chamber 12 and then into the reservoir and thus the flow of ink from the reservoir into the well be increased to quickly fill the well so that the two ducts 14 and 15 will act as automatic means to regulate the flow of ink from the reservoir into the well in accordance with the amount of ink taken from the well.

Obviously, the block 6 and the reservoir 9, and in fact the entire structure can be constructed in any ornamental form which will be pleasing to the eye, if desired.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

An inkstand comprising a body having a well in its front part sloping upwardly and forwardly with its upper end opening out through the top of the body, a reservoir detachably connected to the top of the body and located rearwardly of the well, said body having a passage therein connecting the reservoir with the lower end of the well, a chamber in the body located forwardly of the passage and in rear of the well and in the upper part of the body, a tube connecting the top of the chamber with the upper part of the reservoir, a passage connecting the bottom of the chamber with the lower part of the well, the latter passage being located above the first passage, said body having another passage therein for connecting the upper portion of the well with an intermediate part of the chamber, the last-mentioned passage being located above the second-mentioned passage, whereby when the ink in the well is partly exhausted, air will flow through the upper or last-mentioned passage into the chamber and then into the reservoir when the ink in the well is practically all exhausted air will enter the chamber through both of the passages leading into the chamber and thus increase the flow of ink to the well.

In testimony whereof I affix my signature.

DANIEL WILLEY.